United States Patent [19]

Kanda et al.

[11] 4,394,824

[45] Jul. 26, 1983

[54] ACOUSTIC MICROSCOPE

[75] Inventors: Hiroshi Kanda, Tokorozawa; Isao Ishikawa, Hino; Toshio Kondo, Kunitachi; Kageyoshi Katakura, Nakamachi, all of Japan

[73] Assignee: Hitachi, Ltd., Tokyo, Japan

[21] Appl. No.: 261,032

[22] Filed: May 6, 1981

[30] Foreign Application Priority Data

May 6, 1980 [JP] Japan ............................ 55-58707

[51] Int. Cl.³ .............................................. G01N 29/00
[52] U.S. Cl. ........................................ 73/606; 73/610; 73/620
[58] Field of Search ................. 73/606, 620, 609, 610

[56] References Cited
PUBLICATIONS

"Acoustic Microscopy Applied to Saw Dispersion & Film Thickness Measurement", Weglein, *IEEE Transactions on Sonics and Ultrasonics*, vol. SU-27, No. 2, Mar. 1980, pp. 82–86.

"Signal Processing in the Reflective Acoustic Microscope", Attal et al., *Electronics Letters*, vol. 14, No. 15, pp. 471–473.

*Primary Examiner*—Howard A. Birmiel
*Attorney, Agent, or Firm*—Antonelli, Terry & Wands

[57] ABSTRACT

In an acoustic microscope wherein a piezoelectric transducer disposed on one face of an ultrasonic wave focusing lens radiates an ultrasonic wave into the lens and also converts into an electric signal a reflected wave from a specimen arranged on the side of the other face of the lens, a reflected wave from the interface of the lens and the reflected wave from the specimen are caused to interfere with each other.

7 Claims, 9 Drawing Figures

ACOUSTIC MICROSCOPE

BACKGROUND OF THE INVENTION

1. Field of the Invention

This invention relates to an imaging equipment exploiting ultrasonic radiation, and more particularly to an acoustic microscope.

2. Description of the Prior Art

In recent years, it has become possible to generate and detect acoustic waves at ultra high frequencies reaching 1 GHz and therefore to realize an acoustic wavelength of approximatly 1 μm in the water. As a result, it has become possible to fabricate an acoustic imaging equipment of high resolution. The equipment forms a focused ultrasonic beam with a concave lens, thereby to realize the resolution as high as 1 μm.

A specimen is inserted in the beam, and an ultrasonic wave reflected by the specimen is detected, whereby the elastic properties of a very small area of the specimen are elucidated. Alternatively, while a specimen is being mechanically scanned in two dimensions, the intensity of the resulting signal is displayed as a brightness signal on a cathode-ray tube, whereby a very small area of the specimen can be observed on an enlarged scale.

First, a prior-art construction of such ultrasonic microscopic imaging equipment will be described, and a problem involved therein will be pointed out.

FIG. 1 is a view which shows the schematic construction of a prior art of a transducer system for obtaining a reflected signal from a specimen (as disclosed in, for example, U.S. Pat. No. 4,028,933). An ultrasonic propagating medium 20 (cylindrical crystal of, for example, sapphire or silica glass) has one end face 21 which is an optically polished plane, and the other end face which is formed with a concave semispherical hole 30. An RF pulse ultrasonic wave which is a plane wave is radiated into the crystal 20 by an RF pulse signal which is impressed on a piezoelectric film 10 deposited on the end face 21. The plane ultrasonic wave is focused on a specimen 50 located on a predetermined focal point, by a positive acoustic lens which is formed by the interface between the semispherical hole 30 and a medium 40 (in general, water).

The ultrasonic wave reflected and scattered by the specimen 50 is collected and converted into a plane wave by means of the same lens. The plane wave is propagated through the interior of the crystal 20, and is finally converted into an RF electric signal by the piezoelectric film 10. The RF electric signal is detected by a diode into a video signal, which is used as the input signal of the cathode-ray tube as stated above.

FIG. 2(a) shows detected signals in the video region at the time when, in such prior-art construction, an RF pulse signal having a certain repetition rate $t_R$ was impressed. Here, the axis of abscissas is a time axis and the axis of ordinates represents the intensity of the signal. Letter A designates the applied RF pulse, letter B a reflected signal from the lens boundary, and letter C a reflected signal from the specimen.

In order to discriminate the desired reflected signal C from the reflected signal B, the prior-art imaging equipment adopts a construction in which the duration $t_d$ of the impressed pulse is shortened to the utmost so as to prevent the signals C and B from overlapping each other, whereby only the signal C is taken out by a timing gate as shown in FIG. 2(c).

The resolutions of such equipment include an axial resolution $\Delta\zeta$ in the direction of propagation of the ultrasonic wave, and a lateral resolution $\Delta\gamma$ within a plane perpendicular to the propagating direction of the ultrasonic wave. Both are determined by the wavelength λ of the ultrasonic wave and the F number representative of the brightness of the lens used, and are given by:

$$\Delta\gamma = \lambda \cdot F \quad (1)$$

$$\Delta\zeta = 2\lambda \cdot F^2 \quad (2)$$

Since the F number of the lens which can be fabricated is approximately 0.7, $\Delta\gamma \sim 1$ μm and $\Delta\zeta \sim 1.5$ μm hold in the water (1,500 m/s) when the ultrasonic wave used is at 1 GHz.

However, an IC or LSI which is the most important object to-be-imaged of the ultrasonic microscope requires a better axial resolution. This is because, in the IC, a layered pattern is often finer than a planar pattern as is well known. In actuality, a typical IC has a multi-layered structure consisting of layers 1 μm–3 μm thick. With the axial resolution of 2 μm in the water as above stated, it is utterly impossible that the layers are nondestructively observed independently of one another with the position of a focal point set inwardly of the surface of the IC. The reason is that, since the acoustic velocity is higher in a metal such as silicon and aluminum which is the material of the IC than in the water, the axial resolution is merely 4–10 μm even when the ultrasonic wave at 1 GHz is used.

SUMMARY OF THE INVENTION

An object of this invention is to provide an acoustic microscope which has an enhanced axial resolution.

In order to accomplish the object, this invention makes the duration of an RF pulse variable, so as to cause a reflected ultrasonic wave from a lens boundary to interfere with a reflected ultrasonic wave from a specimen.

DESCRIPTION OF THE PREFERRED EMBODIMENT

The principle of this invention consists in that, to the end of causing a reflected ultrasonic signal C from a specimen to interfere with a reflected ultrasonic signal B from the interface between a lens and water, the duration $t_d$ of an RF pulse is lengthened contrariwise to the case of the prior art.

Referring now to a waveform diagram shown in FIG. 2(d), the principle will be described.

As compared with the reflected signal B from the interface between the lens and the water, the reflected ultrasonic signal C from the specimen returns with a delay equal to a time interval $2Z/V_w$ (where Z denotes the spacing between the lens and the specimen, and $V_w$ the acoustic velocity in the water) in which the ultrasonic wave propagates reciprocatively between the lens and the specimen in the water. Therefore, when the duration $t_d$ of the RF pulse is made long as follows:

$$t_d > 2 Z/V_w (\equiv t_s) \qquad (3)$$

the two reflected signals come to overlap each other. The interference of the two reflected signals can be detected in such a way that the signals in the time range in which they overlap each other are taken out by a timing gate.

More specifically, when the reflected signal B from the interface between the lens and the water is put as follows:

$$V_B(t) = A \sin w_o t, \; t_o < t < t_o + t_d \qquad (4)$$

where $w_o$ denotes the frequency of the ultrasonic wave used, and $t_o = 2 L/V_L$ in which L indicates the length of the lens and $V_L$ the acoustic velocity in the material of the lens, the reflected ultrasonic signal C from the specimen is expressed by:

$$V_C(t) = B \sin w_o(t + 2 Z/V_w), \; t_o + t_s < t < t_o + t_s + t_d \qquad (5)$$

Figure 2A:
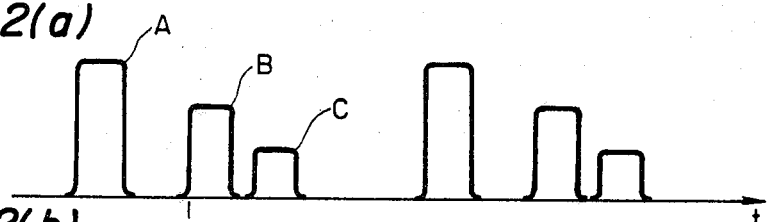
FIGS. 2(a) to 2(f) are waveform diagrams for explaining the operation of the acoustic microscope and the principle of this invention.
Figure 2B:
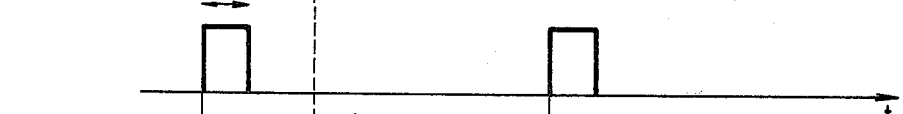
Figure 2C:
Figure 2D:
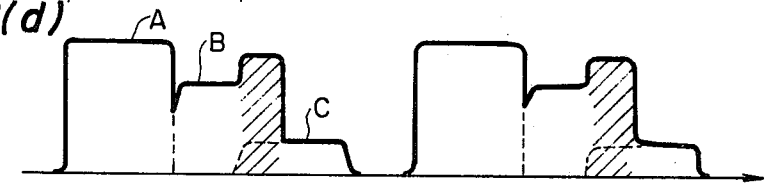

Therefore, the two signals overlap under the condition of Expression (3) and are expressed as $V(t) = A \sin w_o t + B \sin w_o(t + 2 Z/V_w)$ (hatched region in FIG. 2(d)) when:

$$t_o + t_s < t < t_o + t_d \qquad (6)$$

When they are subjected to the square law detection with a diode, they become in the video region as follows:

$$V(t) = A^2 + B^2 + 2 A B \cos(w_o[2Z/V_w]) \qquad (7)$$

When the signals in the time range of Expression (6) are utilized, the following holds:

$$w_o(2Z/V_w) = 2\pi Z/(\lambda/2) \qquad (8)$$

When the spacing Z between the lens and the specimen is changed in conformity with this expression, the detection signals are modulated at a period of $\lambda/2$. In other words, it becomes possible to detect the unevenness of the surface of the specimen or the layered structure within the specimen at a resolution of approximately $\lambda/5$ (modulation degree: 50%). This value $\lambda/5$ corresponds to the axial resolution $\lambda$ (when F=0.7) in the prior-art method, and it turns out that the resolution is improved 5 times by the interference method.

When the ultrasonic wave of 1 GHz is used, the prior art attains only the axial resolutions of approximately 1.5 $\mu$m in the water and 8.4 $\mu$m in silicon (8,400 m/s), whereas this invention can make improvements to high axial resolutions of 0.3 $\mu$m in the water and 1.7 $\mu$m in silicon and permits for the first time the observation of the individual layers of the multilayered structure of the IC as stated in the beginning.

According to this invention, such interference method and the prior-art method are permitted to be properly used merely by changing-over the duration of the RF pulse signal by the use of an identical apparatus.

This is based on the fact that, as apparent from the above description, the two reflected ultrasonic signals B and C do not overlap each other when the duration $t_d$ of the RF pulse signal is made short as follows:

$$t_d < 2Z/V_w \qquad (9)$$

Figure 1:
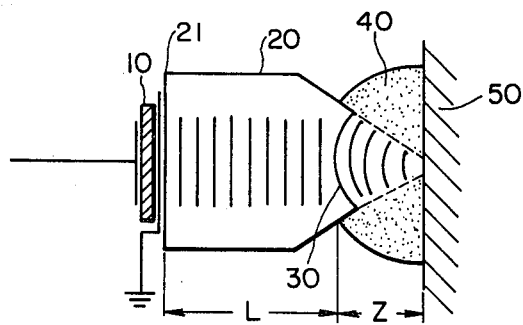
FIG. 1 is a view showing the schematic construction of a prior-art acoustic microscope.
Figure 2E:
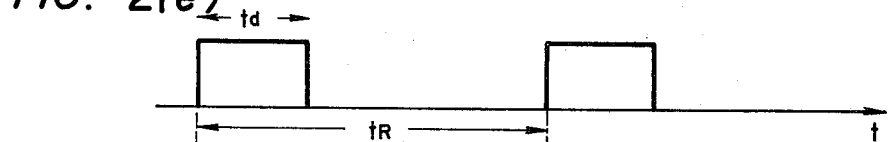
Figure 3:
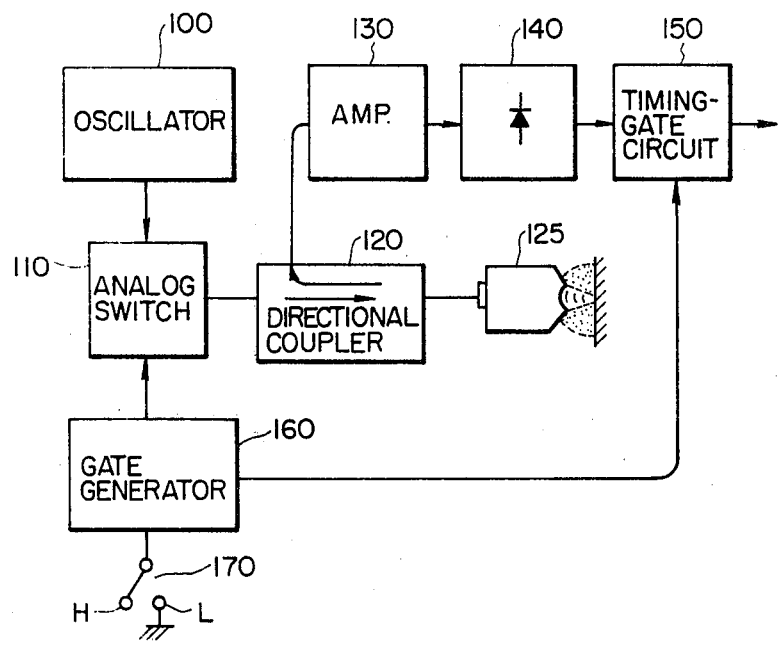
FIG. 3 is a block diagram showing the construction of an embodiment of this invention.
Figure 4:
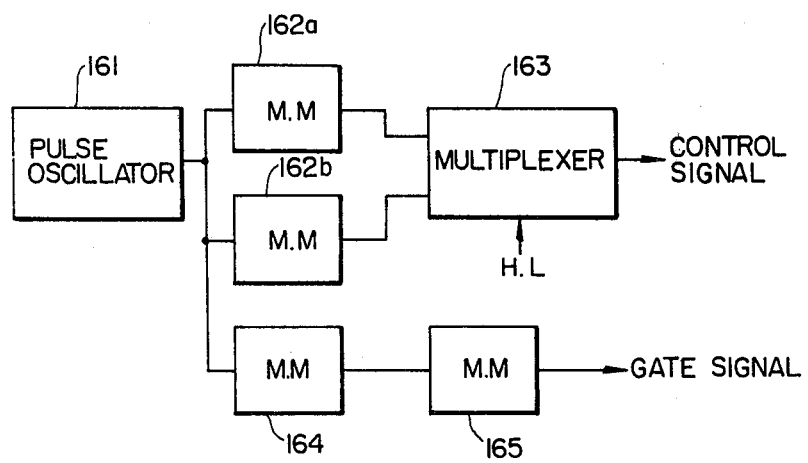
FIG. 4 is a block diagram for explaining a part of the embodiment in FIG. 3.

FIG. 3 is a diagram which shows the construction of an embodiment of an apparatus for materializing this invention. Referring to the figure, numeral 100 designates an RF continuous wave oscillator, numeral 110 an analog switch, numeral 120 a directional coupler, numeral 130 a receiver amplifier, numeral 140 a diode detector, numeral 150 a timing-gate circuit, numeral 125 a transducer as shown in FIG. 1, numeral 160 a gate signal generator, and numeral 170 a change-over switch. In operation, an RF continuous wave signal (at, for example, 1 GHz) generated by the RF continuous wave oscillator 100 is turned by the analog switch 110 into an RF pulse signal of a duration $t_d$, which is impressed on the transducer system (having the construction shown in FIG. 1) 125 through the directional coupler 120. Reflected detection signals are passed through the directional coupler 120 and amplified by the receiver amplifier 130. Thereafter, they are converted into video signals (having a band of approximately 10 MHz) by the diode detector 140, and only the desired signal is sampled as an imaging signal by the timing gate 150. In this case, in the present invention, the gate signal generator 160 is used for turning "on" and "off" the analog switch 110. A control signal for the analog switch 110 is generated from the gate signal generator 160 through the operation of the change-over switch 170. The control signal changes-over the analog switch 110 so as to establish $t_d > 2 Z/V_w$ being the condition of Expression (3) or $t_d < 2 Z/W_w$ being the condition of Expression (9). The construction and operation of an embodiment of the gate signal generator 160 for generating such changing-over control signal will now be described with reference to FIG. 4. Pulses having a repetition rate $t_R$ are generated by a pulse oscillator 161. In response to the rise of each of the pulses, pulses having durations $\Delta t_1$, $\Delta t_2$ and $\Delta t_3$ are respectively formed by multivibrators 162a, 162b and 164. Here, the durations are selected to be $\Delta t_1 < 2 Z/V_w$, $\Delta t_2 < 2 Z/V_w$ and $\Delta t_3 = 2 Z/V_2 + t_s$. Output waveforms of the multivibrators 162a and 162b (shown in FIGS. 2(b) and 2(e), respectively) are selected by a multiplexer 163, depending upon the logic high and low states of the switch 170. The selected signal is used as the control signal of the analog switch 110. More specifically, when the change-over switch 170 is connected on the side of a terminal H shown in FIG. 3, it lies in the logic high state (H in FIG. 4), and the multiplexer 163 selects the control signal of the waveform depicted in FIG. 2(d). On the other hand, when the change-over switch 170 is connected on the side of a terminal L shown in FIG. 3, it is in the logic low state (L in FIG. 4), and the multiplexer 163 selects the control signal of the waveform depicted in FIG. 2(e).

Figure 2F:
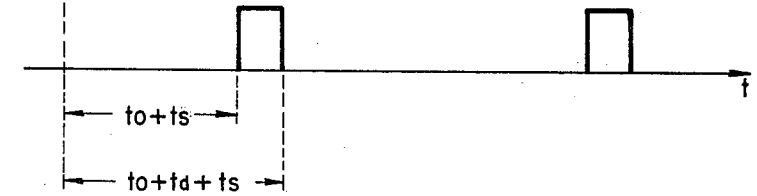

The output of the multivibrator 164 is applied to a multivibrator 165 again, thereby to form a pulse delayed $\Delta t_3$. This pulse is used as the gate signal of the timing gate 150 (signal of a waveform depicted in FIG. 2(c) or 2(f)). the reflected signal from the specimen appears is not changed even by the change-over of the operation mode from the prior art to this invention or vice versa. Therefore, the same gate signal can be used advantageously.

As set forth above, according to this invention, the duration of the RF pulse is prolonged with reference to $2Z/V_w$, whereby the interference method of this invention can be readily realized in the acoustic microscope. Therefore, this invention contributes greatly to the enhancements of performances such as the enhancement of the axial resolution, and it is powerful in the defect inspection and quality assurance of ICs and LSIs and very greatly contributive to the art.

Besides the case of obtaining the ultrasonic image with the acoustic microscope, this invention is applicable to the following measurements:

1 The measurement of the height of a sample surface as based on the detection of the unevenness of the sample surface; 2 the measurement of an acoustic velocity in an unknown fluid which exists between the lens and the sample, as based on the period (which is $\lambda/2$) of a pattern indicated by reflected signals obtained by changing the spacing between the lens and the sample; etc.

We claim:

1. An acoustic microscope having a first ultrasonic propagating solid medium, ultrasonic wave generator means for generating an ultrasonic wave from one end of said solid medium, a concave spherical surface formed at the other end of said solid medium, a second ultrasonic propagating medium arranged between said conical spherical surface and a specimen, driver means for driving said ultrasonic wave generator means with an electrical signal to effect generation of the ultrasonic wave whereby in response to the generated ultrasonic wave an ultrasonic wave is reflected from said specimen and a ultrasonic wave is reflected from the boundary between said concave spherical surface and said second ultrasonic propagating medium, and detector means for detecting the ultrasonic wave reflected by said specimen, said driver means driving said ultrasonic wave generator means with an electrical signal having characteristics to cause the reflected ultrasonic wave from said specimen to interfere with the reflected ultrasonic wave from the boundary between said concave spherical surface and said second ultrasonic propagating medium.

2. An acoustic microscope according to claim 1, wherein said driver means includes means for generating a pulse signal, and means for varying the duration of the pulse signal as a characteristic of the electrical signal for causing the reflected ultrasonic waves to interfere.

3. An acoustic microscopic according to claim 2, wherein said pulse signal generator means comprises an RF continuous wave oscillator, switching circuit means for converting a continuous wave from said oscillator into a pulse signal, and control circuit means for controlling an ON/OFF time of said switching circuit means, said control circuit means controlling said switching circuit means so that the duration of said pulse signal becomes $2Z/V_w$ (where $Z$ is the distance between said boundary and said specimen, and $V_w$ is the acoustic velocity in said second ultrasonic propagating medium).

4. An acoustic microscope according to claim 3, wherein the interference of the reflected waves is an overlapping in time of the ultrasonic wave reflected from said specimen and the ultrasonic wave reflected from the boundary.

5. An acoustic microscope according to claim 4, wherein said detector means includes means for detecting the overlapping of the reflected waves for enabling detection of the ultrasonic wave reflected by said specimen as an indication of characteristics of said specimen.

6. An acoustic microscope according to claim 1, wherein said ultrasonic wave generator means is a piezoelectric device.

7. An acoustic microscope according to claim 1, wherein said detector means includes means for detecting the interference of the reflected ultrasonic wave from said specimen and the interference ultrasonic wave from the boundary for enabling detection of the ultrasonic wave reflected by said specimen as an indication of characteristics of said specimen.

* * * * *